(12) United States Patent  (10) Patent No.: US 6,631,695 B2
Shin  (45) Date of Patent: Oct. 14, 2003

(54) FODDER MIXING AND FEEDING THE FODDER, METHOD AND APPARATUS FOR SUPPLYING FODDER USING THE SAME

(76) Inventor: Il-Hyun Shin, 196 KwanSan-dong, GoYang-Si, GyunGi-Do, 412-802 (KR)

(*) Notice: Subject to any disclaimer, the term of this patent is extended or adjusted under 35 U.S.C. 154(b) by 0 days.

(21) Appl. No.: 09/959,024

(22) PCT Filed: Jan. 10, 2001

(86) PCT No.: PCT/KR01/00029

§ 371 (c)(1),
(2), (4) Date: Oct. 15, 2001

(87) PCT Pub. No.: WO01/50844

PCT Pub. Date: Jul. 19, 2001

(65) Prior Publication Data

US 2002/0157614 A1 Oct. 31, 2002

(30) Foreign Application Priority Data

Jan. 14, 2000 (KR) .......................................... 2000-1675
Jul. 18, 2000 (KR) ........................................ 2000-40998

(51) Int. Cl.[7] ................................................ A01K 29/00
(52) U.S. Cl. ..................................................... 119/57.4
(58) Field of Search ............................. 119/57.4, 56.2, 119/57.6, 51.5, 51.02, 57

(56) References Cited

U.S. PATENT DOCUMENTS

| 3,286,692 A | * | 11/1966 | Metzger | 119/57.4 |
|---|---|---|---|---|
| 3,587,529 A | * | 6/1971 | Wienert et al. | 119/51.5 |
| 3,738,532 A | * | 6/1973 | Fimbault | 222/63 |
| 4,223,638 A | * | 9/1980 | Sappington et al. | 119/57.6 |
| 4,672,917 A | * | 6/1987 | Fox | 119/57.1 |
| 4,722,301 A | * | 2/1988 | Strong | 119/57.4 |
| 4,981,107 A | * | 1/1991 | Beaudoin et al. | 119/56.2 |
| 5,069,165 A | * | 12/1991 | Rousseau | 119/57.6 |
| 5,424,957 A | * | 6/1995 | Kerkhoff et al. | 700/240 |
| 5,740,757 A | * | 4/1998 | Smeester | 119/51.02 |
| 6,067,932 A | * | 5/2000 | Ojaniemi | 119/51.02 |

FOREIGN PATENT DOCUMENTS

EP          0 699 388 A3    5/1996 ............. A01K/5/00

* cited by examiner

Primary Examiner—Charles T. Jordan
Assistant Examiner—Bret Hayes

(57) ABSTRACT

The present invention relates to a method for automatically supplying fodder into a large cowshed and an apparatus for carrying out the method, wherein moving rails are built on a passageway of a plurality of partitioned shed groups, a feeder for mixing and feeding the fodder is arranged on the passageway movably back and forth, the fodder being supplied from a storage tank for raw material established outside the cowshed into the feeder for mixing and feeding the fodder while the fodder is measured automatically so that the fodder can be mixed during the movement, and component and ratio of the mixed fodder are set up differently base on the partitioned shed groups, whereby the required mixed fodder is supplied automatically to each of the partitioned shed groups.

3 Claims, 8 Drawing Sheets

FODDER MIXING AND FEEDING THE FODDER, METHOD AND APPARATUS FOR SUPPLYING FODDER USING THE SAME

TECHNICAL FIELD

The present invention relates to a method and an apparatus for automatically supplying mixed fodder into cowsheds; and, more particularly, to a feeder for mixing and feeding fodder, a method and an apparatus for automatically supplying fodder into large cowsheds, provided with a raw material storage tank charged with a raw material for fodder, a feeder for mixing the raw material from the raw material storage tank with coarse fodder into mixed fodder, while moving to a cowshed, sensors for monitoring the movement of the feeder, and a control portion for controlling all parts of the apparatus.

BACKGROUND ART

There is a growing tendency for the latest stock farms to be more specialized and get larger in scale to produce a good quality of products, e.g., a good quality of meat or milk from healthy cattle or cow under assistance by the development of stockbreeding technology.

Many of the stock farms breed a number of livestock in such a way that the livestock are firstly classified into a plurality of groups based on, e.g., their milking capacities and the livestock are separately received in a plurality of cowsheds formed by partitioning a large shed, according to the classified group.

The time when fodder is supplied, components of the fodder and an amount of the fodder become important factors for increasing the quality of milk and obtaining good cows or cattle in growth and health.

In the supply of the fodder to the livestock, especially, cows, selecting the component for the fodder and supplying the fodder to the cows have to be more carefully made based on surroundings of the farm, an environmental condition, lifetime of the cows, a capacity of milking of the cows, and the quality of milk.

In most of the stock farms, a mixed fodder is manually prepared by roughly cutting the raw material or coarse fodder into mixed fodder and a worker supplies the mixed fodder into the cowsheds by walking about from place to place. In a larger farm in scale, the supply of the mixed fodder is made using a separate means for movements.

However, the separate transportation means is cumbersome because a driver is necessary to operate or drive the transportation means. Further, if the existing transportation means is used as the movement means for the farms, there are many problems in that the existing transportation means is not specified in the working on the farms and consumes unnecessarily a large amount of gas, thereby even making a smoke pollution caused by its exhaust gas within the cowshed.

Further, since the supply of the mixed fodder to the livestock has to be made periodically, it bothers the worker.

Moreover, it is difficult to adjust the amount of the raw material for the fodder or the coarse fodder and hence the mixed fodder to be fed to the livestock, since the whole works are performed manually, thereby even necessitating a skilled person for those works.

The difficulties in adjusting the amount of the raw material or the coarse fodder cause irregular components or amount of the mixed fodder. Therefore, balanced nutritional feed cannot be supplied to the livestock. As a result, the cows cannot produce a constant amount of milk and a good quality of milk.

In addition, if different amount of the mixed fodder continues to be fed, the number of underdeveloped livestock may be increased.

DISCLOSURE OF THE INVENTION

It is, therefore, a primary object of the invention to provide a method and an apparatus for automatically supplying fodder into large cowsheds using a feeder for mixing and feeding the fodder.

The above and other objects of the invention are accomplished by providing a method and apparatus using a feeder for mixing and feeding fodder provided with a mixing means provided with a plurality of rotary screws, a driving mixing motor and a gear box, and a discharge means for raising and lowering doors mounted to both sides of a main body by using cylinder mechanisms, the feeder characterized in that rollers and a movement means constructed with reversible movement motors for rotating the rollers are mounted on a bottom of the main body and a control box is provided in a lateral portion of the main body, whereby the mixing means, a discharge means and the movement means are controlled by the control box.

BRIEF DESCRIPTION OF THE DRAWINGS

The above and other objects and features of the instant invention will become apparent from the following description of preferred embodiments taken in conjunction with the accompanying drawings, in which.

MODES OF CARRYING OUT THE INVENTION

Preferred embodiments of the present invention will now be described with reference to the accompanying drawings.

Figure 1:
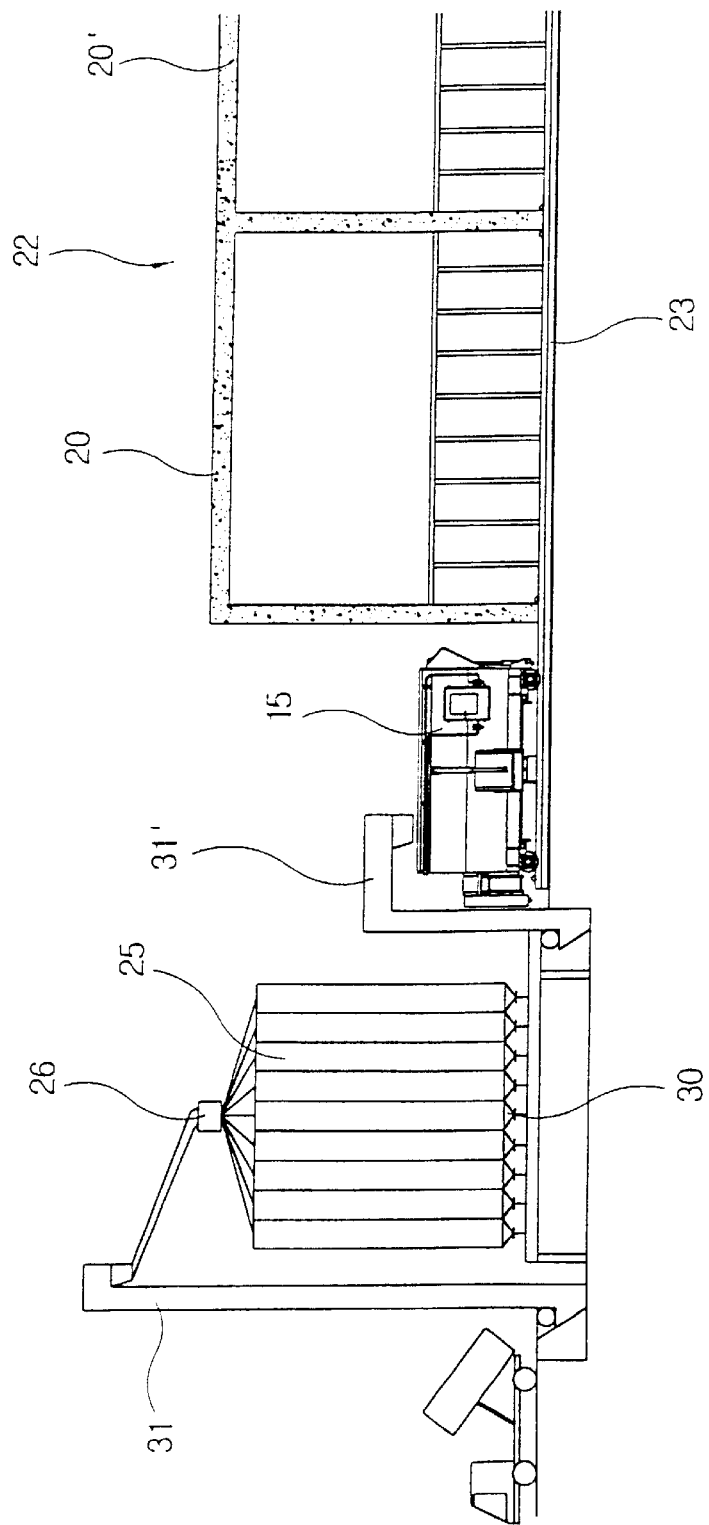
FIG. 1 illustrates a schematic view of a whole apparatus for automatically supplying fodder into cowsheds in accordance with the present invention.
Figure 2:
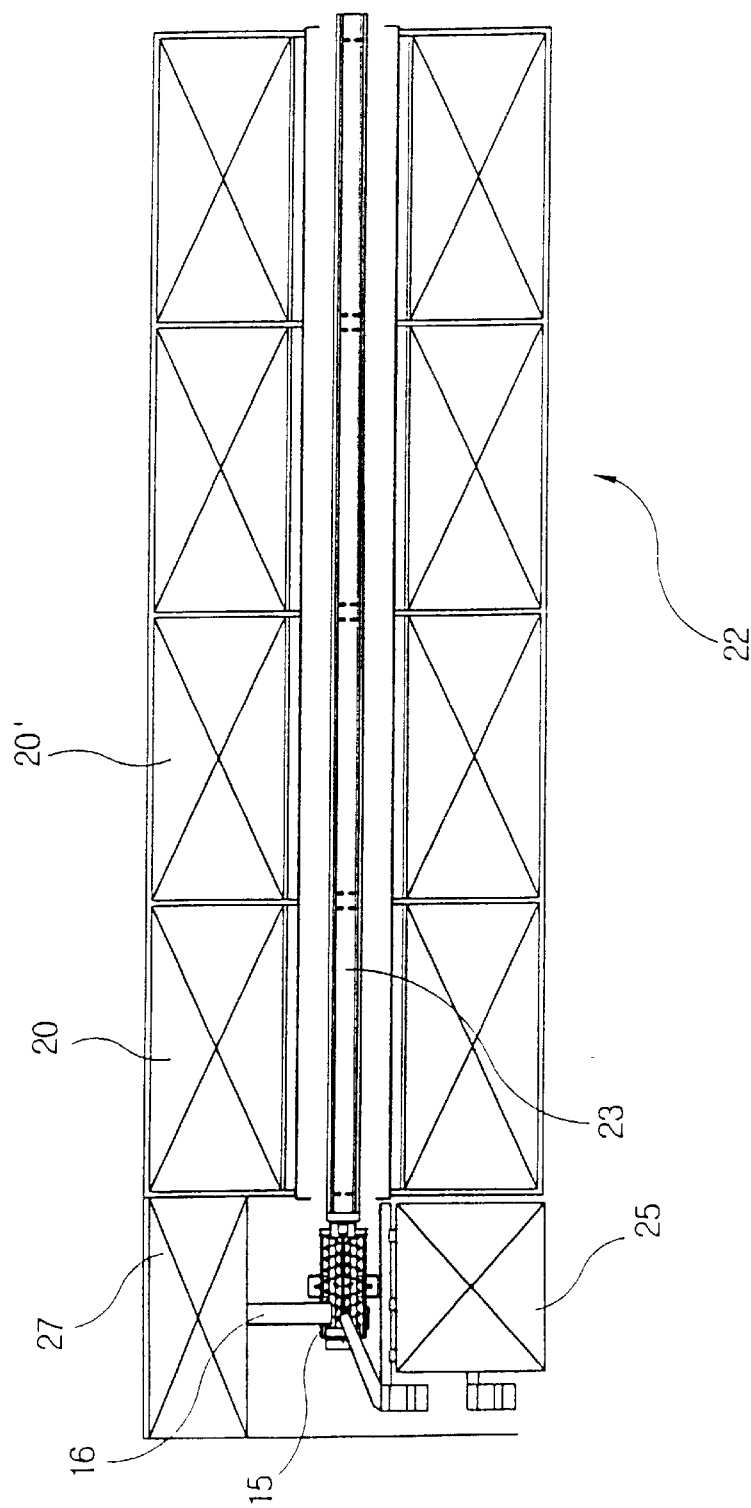
FIG. 2 depicts a top planar view of a whole apparatus for automatically supplying fodder into cowsheds in accordance with the present invention.

FIG. 1 shows a schematic view of a whole mixed fodder supply apparatus in accordance with the present invention: and FIG. 2 shows a top planar view of tie apparatus shown in FIG. 1.

The inventive mixed fodder supply apparatus includes a mixing means 4 provided with a plurality of rotary screws 1 and 1', a driving mixing motor 2 and a gear box 3, and a discharge means 8 for raising and lowering doors 6 and 6' mounted to both side of a main body 5 by using cylinder mechanisms 7 and 7'.

The inventive mixed fodder supply apparatus is characterized in that rollers 9 and 9' and a movement means constructed with reversible movement motors 10 and 10' for rotating the rollers 9 and 9' are mounted on a bottom of the main body 5 and a control box 12 is provided in a lateral portion of the main body 5, whereby the mixing means 4, the discharge means 8 and the movement means 11 are controlled by the control box 12.

The movement means 11 drives the reversible movement motors 10 and 10' under the control of the control box 12 and the main body 5 is moved back and forth by a rotation of the rollers 9 and 9' in response to the rotation of the reversible movement motors 10 and 10'.

Further, sensors 13 and 13' for detecting vertical opening and closing movements of the doors 6 and 6' mounted to both sides of the main body 5 are attached to an upper portion and a lower portion of each of the doors 6 and 6'. A blade 14 for removing fodder being fallen down on a bottom or on an upper surface of rail 23 is mounted to a bottom portion of the main body 5 in an inclined relationship therewith.

An inventive method for automatically supplying fodder into a cowshed comprises the steps of supplying a raw material for fodder associated with the cowshed selected by the operator from a raw material storage tank equipped with a dispenser into a feeder for mixing the raw material into fodder and feeding the mixed fodder to the cowshed: moving the feeder to the selected cowshed, while the raw material for the fodder is mixed in the feeder by a mixing means arranged in the feeder at the same time: detecting that the feeder arrives at the selected cowshed by means of a sensor and discharging the mixed fodder for the cowshed: and terminating the discharge of the mixed fodder from the feeder being moved, by a section limit sensor for the selected cowshed and returning the feeder to its initial position.

The inventive steps may be performed in such a way that only one cowshed is selected whenever necessary, and those steps are performed to only the selected cowshed. Further, the steps may be repeatedly performed to the selected cowsheds at a given time interval. That is, whenever the time set by the operator comes up, the raw material storage tank and the feeder are automatically operated to supply the mixed fodder to the each of the selected cowsheds.

In accordance with the present invention, when the raw material is supplied to the feeder from the raw material storage tank, a kind and an amount of the raw material can be selected for differently supplying the fodder according to the cowsheds to which the fodder is supplied. This can be done after data about the cowsheds are arranged and input.

Accordingly, different fodder can be supplied into the cowsheds receiving therein different livestock in terms of, e.g., a growth process or a certain property, e.g., whether the livestock is beef cattle or cows.

An apparatus for carrying out this method is provided with a shed 22 in which a plurality of cowshed groups 20 and 20' are divided into about a central passageway 21, rail 23 formed on the central passageway 21, a plurality of sensors 24 and 24' mounted on top of the rail 23, a feeder 15 moving back and forth along the rail 23 by reversible movement motors 10 and 10', a raw material storage tank 25 and a coarse fodder storehouse 27 formed outside the shed 22, and a dispenser 26.

The pair of sensors 24 and 24' formed on top of the rail 23 are located in both a start end and a termination end, respectively, of each of the cowsheds.

Reference numeral 30 means an automatic measure hopper and reference numerals 31 and 31' indicate an elevator.

Hereunder, detailed description of operations of the present invention will be made with reference to accompanying drawings.

Figure 3:
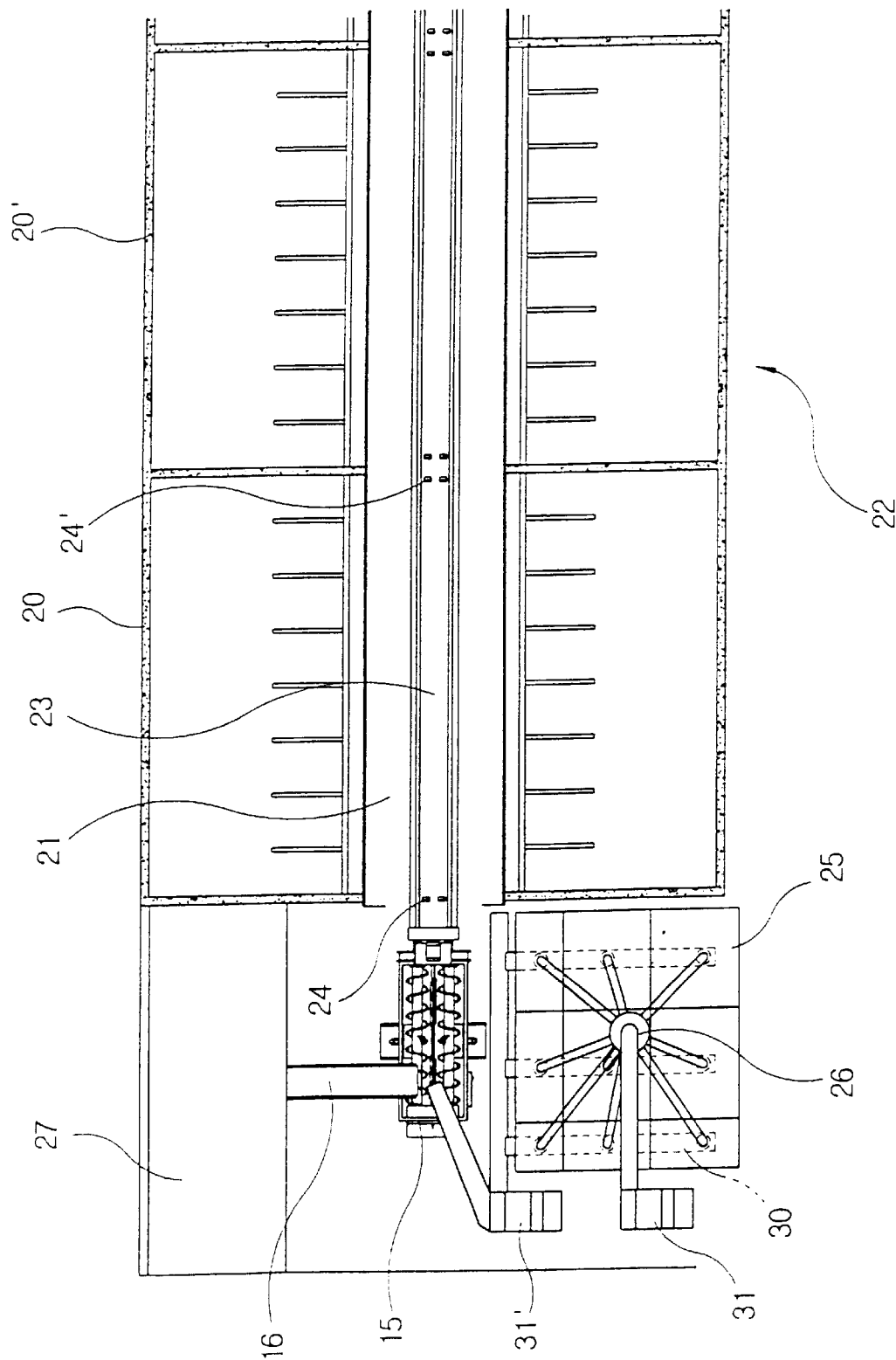
FIG. 3 gives a partially enlarged planar view of a whole apparatus for automatically supplying fodder into cowsheds in accordance with the present invention.
Figure 4:
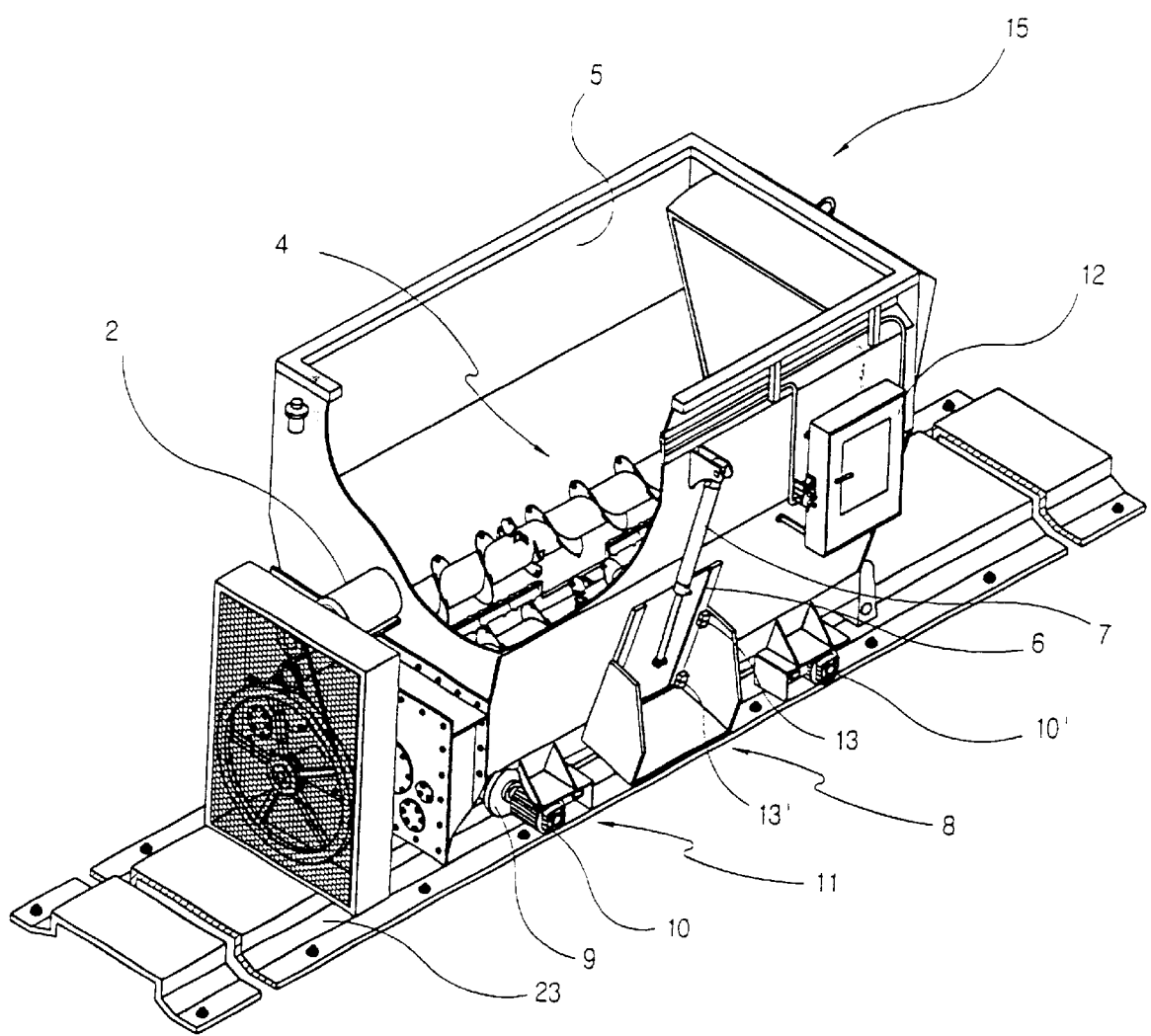
FIG. 4 shows a perspective view of a feeder for mixing and feeding fodder in accordance with the present invention.
Figure 5:
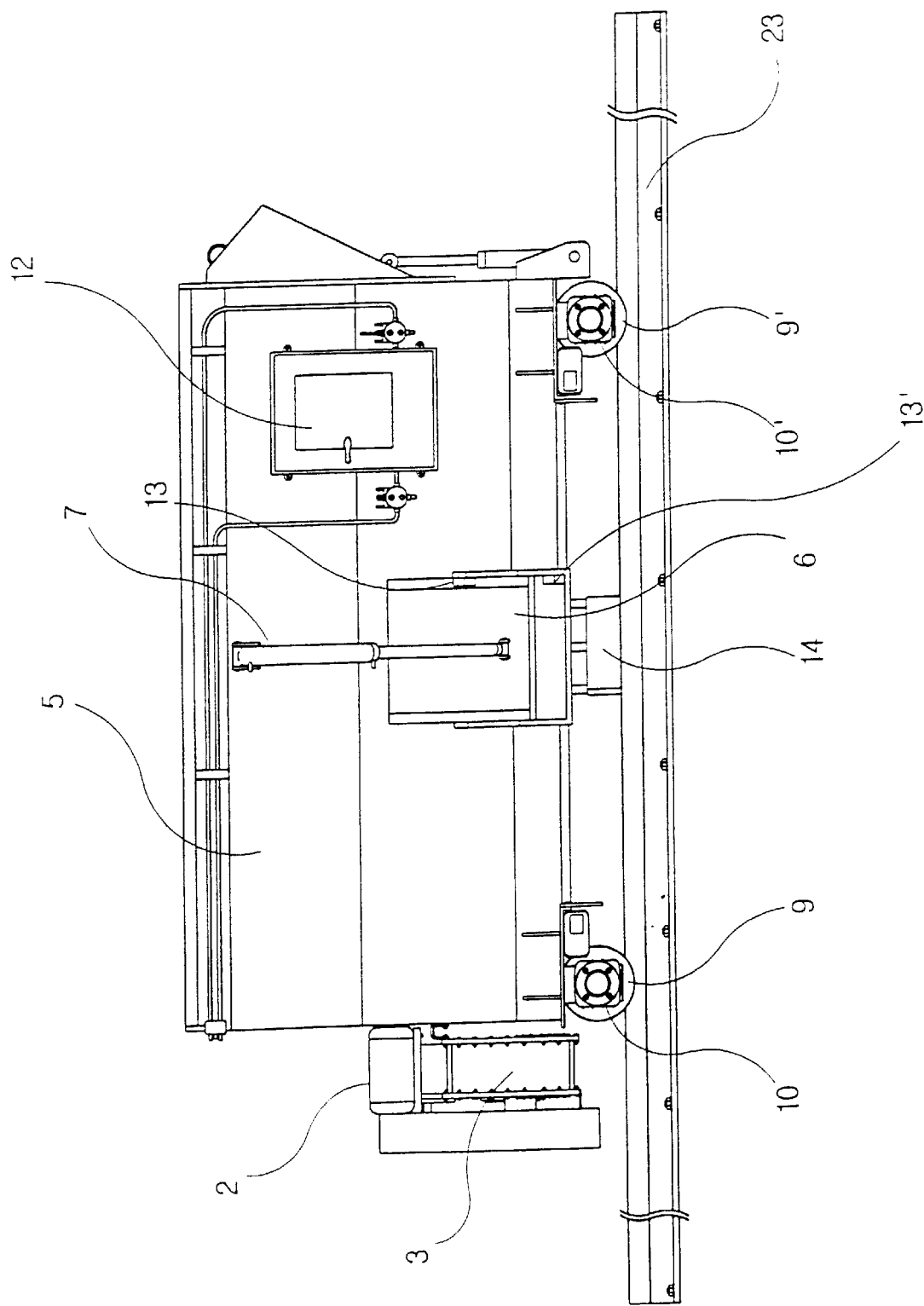
FIG. 5 presents a frontal elevational view of a feeder for mixing and feeding fodder in accordance with the present invention.
Figure 6:
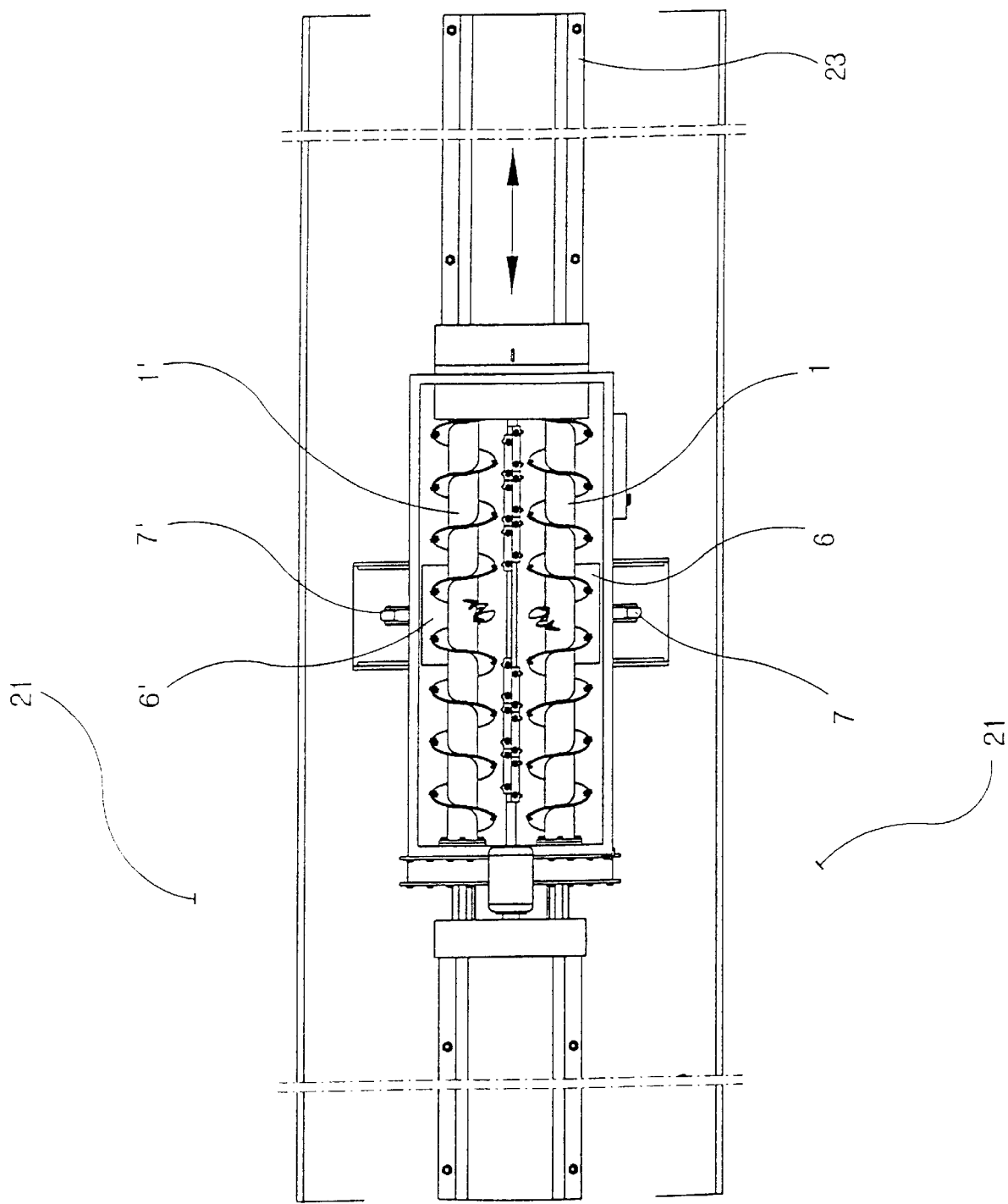
FIG. 6 represents a top planar view of a feeder for mixing and feeding fodder in accordance with the present invention.

FIG. 3 shows a partially enlarged top planar view of the inventive feeder.

Firstly, a supply of the fodder into the feeder 15 is described.

The raw material for the fodder is loaded on a raw material carrier (not shown) and supplied into the elevator 31 provided in one side of the raw material storage tank 25 or the coarse fodder storehouse 27. Next, the elevator 31 raises the raw material to supply it to the dispenser 26 which is equipped on a top portion of the raw material storage tank 25 or the coarse fodder storehouse 27 and classifies the raw material depending upon kinds thereof. Later, the raw material is supplied into the feeder 15.

Further, the control box 12 has therein a conventional control portion being electrically connected to a switching portion connected to a power source and operating each of parts, the reversible motors 10 and 10' connected to the switching portion, and cylinders 7 and 7' for a discharge door, as shown in FIGS. 4 to 7.

The control box 12 to which electricity will be applied further has a timer(not shown) on which tie operation of the inventive feeder is based.

The timer's triggering after the time period set by the operator has elapsed causes the feeder 15 to move toward a first target cowshed group 20. When the feeder 15 arrives at a start end of the first target cowshed group 20, the sensor 24 detects the arrival of the feeder 15 to signal for the feeder 15 to start discharging the fodder. Then, the cylinder 7 or 7' is operated to open the door 6 or 6'. When the sensor 13 positioned on an upper portion of the door 6 or 6' detects a completion of the door opening, the rotary screw 1 or 1' and the reversible movement motor 10 or 10' for the travel of the feeder 15 are operated to move the feeder 15 and discharge the fodder out of the feeder 15 at the same time.

In other words, since the supply of the mixed fodder is performed in such a manner that the feeder 15 moves while discharging the mixed fodder with the door 6 or 6' being completely opened, a constant amount of the mixed fodder can be supplied into the cowshed group while the feeder 15 moves from the start end of the cowshed group to the termination end, thereby achieving a prompt supply of the mixed fodder in a constant rate.

Further, the rotary screw 1 or 1' is rotated by applying electricity to the driving mixing motor 2. The rotation of the driving mixing motor 2 is transmitted to the rotary screw 1 or 1' via the gear box 3 which serves to increase the driving torque, so that even long herbage or rice straw can be cut by the rotary screw 1 or 1'.

While the main body 5 performs the discharge of the mixed fodder, moving along the rail 23, the other sensor 24' detects the arrival of the feeder 15 at a point of the termination end of the cowshed group to send signals to the control portion. The control box 12 having therein the control portion allows the feeder 15 to be returned to its original position by contrarily rotating the reversible movement motor 10 or 10' in response to the signal from the sensor 24'.

According to the present invention, during the backward movement of the feeder 15, the mixing means 4 and the discharge means 8 may be also operated to perform their functions, i.e., to mix the fodder and to discharge the mixed fodder out of the feeder 15.

When the supply of the mixed fodder is completely finished and this is signaled to the control portion by the sensor 24', the electricity is cut off from the reversible movement motors 10 and 10' for the rotation of the rollers 9 and 9' and the cylinder 7 or 7' of the discharge means 8 is operated to close the door 6 or 6'.

After that, when the sensor 13' detects that the door 6 or 6' is completely closed, the electricity is cut off to stop the rotation of the rotary screw 1 or 1', leaving the whole feeder 15 in a standby state.

Figure 7:
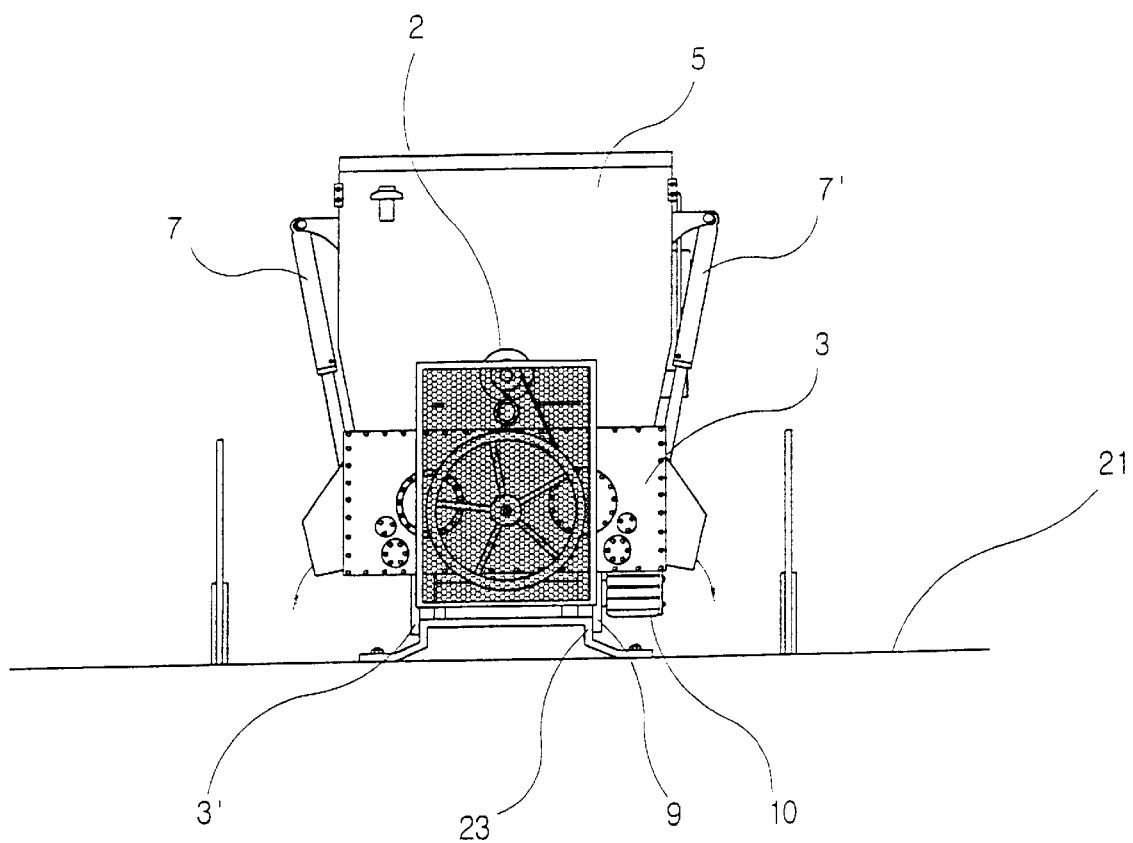
FIG. 7 offers a side elevational view of a feeder for mixing and feeding fodder in accordance with the present invention.

As well illustrated in FIG. 7, the rail 23 employed in the present invention is made of a plate with its lateral edges bent downwardly, rather than the conventional rails in which a pair of guiding walls extend in a parallel relationship with each other. The rollers 9 and 9' are retained on the lateral edges of the plate, respectively, for the movement of the feeder 15. Accordingly, this configuration of the present invention can prevent the problem in that alien material, e.g., the mixed fodder is accumulated between the guiding walls of the conventional rails and facilitate the cleaning operation to keep the shed in a more cleaned condition.

Further, the blade 14 made of a rubber having a resilience is vertically mounted to a bottom of the main body 5 with a bottom end of the blade 14 being contacted to the upper surface of the rail 23. The blade 14 is mounted to the main body 5, being inclined therewith. For this configuration, when the feeder 15 moves back and forth along the rail 23, various kinds of the mixed fodder fallen down on or remaining on the rail 23 are driven away in a certain direction by the blade 14, thereby leaving the upper surface of the rail 23 in a cleaned condition.

The operations described above can be triggered by the timer. The timer may be configured to apply electricity to the control portion for the start of the fodder supply, when a given time period set by the operator has elapsed. Accordingly, the mixed fodder can be automatically supplied at an interval previously determined by the operator in even a case that the operator is not present, thereby enabling managing the entire fodder supply in a convenient manner.

On the other hand, the movement means of the present invention which is provided in a lower portion of the feeder 15 and constituted with the reversible movement motor 10 and 10' for rotating the roller 9 and 9', the rollers 9 and 9' and the rail 23 enables a very efficient travel of the feeder 15 without requiring a large area in the shed.

The inventive feeder 15 can perform its who e operations, e.g., the mixing and discharge operations, not only in an automated mode but also in a manual mode. The manual mode is proceeded by a plurality of buttons(not shown) arranged in the control box 12. That is, only the mixing means 4 can be operated or only the operation of the discharge means 8 can be enabled. Further, the main body 5 can be moved back and forth without performing the mixing and discharge operations. In a case of malfunctions of the feeder or other parts or a defect of associated facilities, the operator can manually control the whole fodder supply operations for safety.

The entire operations of the inventive apparatus for automatically supplying the fodder into the cowsheds in combination with the feeder described above will be described hereunder.

The operation is started by the operator or by the timer having a certain time interval set by the operator.

Firstly, the raw material for the fodder is selected according to the cowshed group to which the fodder is supplied and then the selected raw material is supplied from the raw material storage tank 25 at a predetermined amount. Next, the automatic measuring hopper 30 measures an exact amount of the raw material to be supplied to the livestock, e.g., cows or cattle, based on the kind or weight, a rate of growth of the livestock. The raw material for the mixed fodder then is supplied to the feeder 15 via the elevator 31'. In the coarse fodder storehouse 27, a required amount of the coarse fodder for the cowshed group to which the coarse fodder is supplied is measured based on the livestock in the cowshed group and then is supplied to the feeder 15 via a conveyor belt 16 at the time when the raw material is transferred to the feeder 15.

The raw material and the coarse fodder optimized in their components and amounts based on the condition of the livestock to be fed ensure an appropriate balanced nutrition of the livestock to be fed, thereby, e.g., obtaining a good quality of milk in a constant production ratio.

When the supply of the raw material and the coarse fodder optimized in component and amount to the feeder 15 is completed, the feeder 15 moves along the rail 23, while the mixing means 4 in the feeder 15 cuts the rice straw and the dried herb into thin and small fodder and mixes the thins and small fodder with the raw material by means of the rotary screws 1 and 1' driven by the driving motor 2, to generate the mixed fodder.

While the feeder 15 moves along the rail 23, making the mixed fodder, one of the sensors 24 or 24' positioned on the rail 23 detects the arrival of the feeder 15 at the selected cowshed group. At the time, the mixed fodder is discharged out of the feeder 15 to be supplied into the selected cowshed group.

While the feeder 15 moves along the rail 23, discharging the mixed fodder, the other sensor 24 or 24' detects the arrival of the feeder 15 at the termination point of that cowshed group. At the time, the discharge of the mixed fodder is stopped and then the feeder 15 is returned to its original position, i.e., a position near the raw material storage tank 25 or the coarse fodder storehouse 27.

With this configuration of the present invention, it is possible to supply the mixed fodder optimized in component and amount based on the condition of the livestock to be fed.

Meanwhile, in a case that the operator designates more than two cowshed groups to which the mixed fodder is supplied, the procedures described above are repeated. Accordingly, even if the two cowshed groups require different kinds of raw material or coarse fodder in different amounts and in their section lengths, problematic situation does not occur.

Further, in a case that the supply of the mixed fodder is performed to all of the cowshed groups, rather than the partial cowshed group or groups selected by the operator, all the operator has to do is to simply set the control box 12 to perform those operations to all of the cowshed groups. Accordingly, the supply of the mixed fodder to all of the cowshed groups can be automatically performed.

According to the present invention described above, the supply of the mixed fodder to the partially selected cowshed group or groups or all of the cowshed groups can be controlled in a convenient manner by using a time adjusting means such as timer.

Further, in even a case that the operator cannot be present in the farm or at a place around the shed, a repeated and regular supply of the mixed fodder to the livestock which ensures healthy livestock and a good quality of milk can be achieved by setting up the time schedule.

Figure 8:
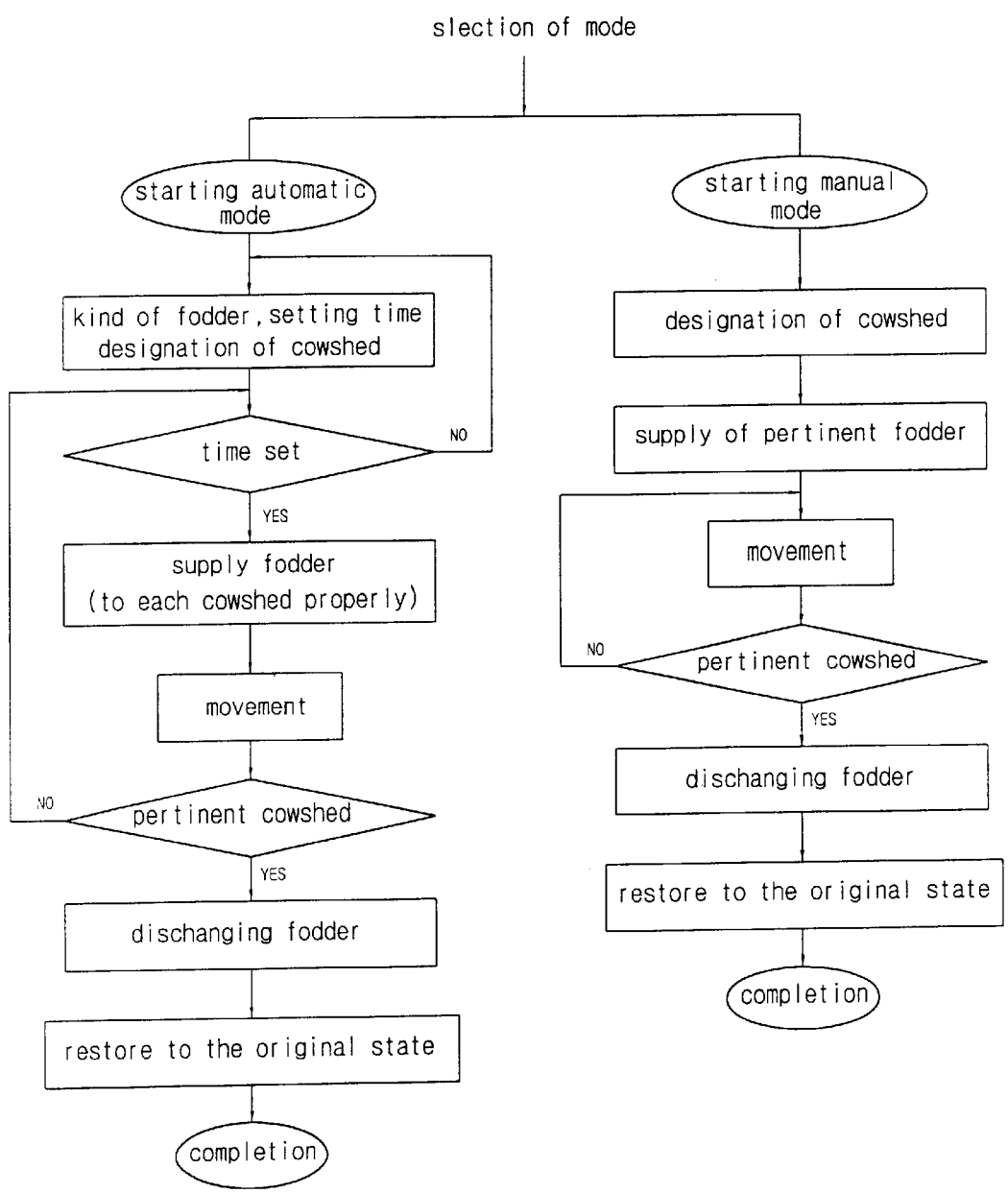
FIG. 8 discloses a block diagram of an inventive method for automatically supplying fodder into cowsheds.

In the supply method in accordance with the present invention, the entire supply operations can be selectively proceeded, as shown in FIG. 8. In the manual mode, the operator directly controls the supply of the mixed fodder, whereas, in the automated mode, the supply operations are automatically triggered to the selected cowshed group or groups after a given time interval has elapsed.

On the other hand, although it has been described that the control box controls the portions which can be operated under the automated mode, e.g., the feeder, the raw material storage tank, the coarse fodder storehouse 27, the conveyor belt, etc., a remote control far away from the feeder or the shed, e.g., in the house, may be available by using an online connection system between the controller and the feeder or the shed.

INDUSTRIAL APPLICABILITY

According to the inventive method and apparatus for automatically supplying the mixed fodder into the cowshed group employing the feeder described above, wherein the raw material and the coarse fodder are automatically measured out from the storage tanks outside the shed and then supplied to the feeder, the raw material and the coarse fodder optimized in their components and amounts based on the livestock to be fed can be automatically supplied into the selected cowshed group.

Although the present invention has been shown and described with respect to the preferred embodiments, it will be understood by those skilled in the art that various changes and modifications may be made without departing from the spirit and scope of the invention as defined in the following claims.

What is claimed is:

1. An automated feeder for mixing and feeding fodder comprising a mixing means having a plurality of rotary screws, a driving mixing motor and a gear box, and a discharge means for raising and lowering doors mounted to both sides of a main body by using cylinder mechanisms, the feeder characterised in that rollers and a movement means constructed with reversible movement motors for rotating the rollers are mounted on a bottom of the main body and the main body is mounted on a rail, and a control box is located in a lateral portion of the main body, whereby the mixing means, the discharge means and the movement means are controlled by the control box.

2. The feeder of claim 1, wherein sensors for detecting vertical opening and closing movements of the doors are attached to an upper portion and a lower portion of each of the doors.

3. An automated feeder for mixing and feeding fodder comprising a mixing means having a plurality of rotary screws, a driving mixing motor and a gear box, and a discharge means for raising and lowering doors mounted to both sides of a main body by using cylinder mechanisms, the feeder characterised in that rollers and a movement means constructed with reversible movement motors for rotating the rollers are mounted on a bottom of the main body and the main body is mounted on a rail and a control box is located in a lateral portion of the main body, whereby the mixing means, the discharge means and the movement means are controlled by the control box, and wherein a blade for removing fodder being fallen down on a bottom or on an upper surface of rails is mounted to a bottom portion of the main body in an inclined relationship therewith.

* * * * *